Figure 1:
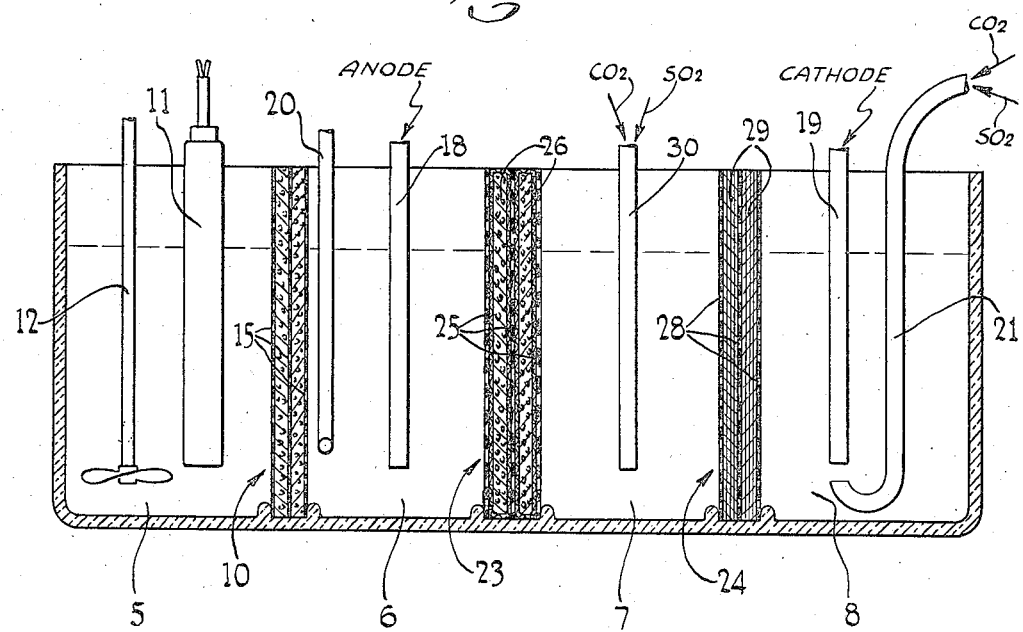

Patented Aug. 17, 1948

2,447,386

UNITED STATES PATENT OFFICE 2,447,386

PROCESS FOR OBTAINING ALUMINUM HYDROXIDE FROM SILICATES

George Antonoff, City Island, N. Y.

Application October 25, 1943, Serial No. 507,645

2 Claims. (Cl. 204—96)

The present invention has for an object to provide an improved process for obtaining aluminum hydroxide from clays and other silicates and from other natural deposits.

The invention aims also to provide an improved electrolytic cell arrangement for the treatment of silicates to break the silica bond and to produce aluminum hydroxide at the cathode effectively separated from certain impurities commonly found in natural materials.

The preferred embodiment of the invention affords a chemical and electrolytic process wherein the bond of the silicate is broken and wherein the silica is deposited at the anode and aluminum hydroxide is formed at the cathode in relatively pure state while impurities are deposited separately.

The silicate to be treated according to the invention is ground, preferably wet-ground, to a fineness approaching the colloidal state and combined to form a slurry with a considerable quantity of water containing a small amount of sulphuric acid and a suitable amount of hydrofluoric acid. The percentage of hydrofluoric acid may be varied as experiment with particular silicates and the requirements of the process may indicate. When the hydrofluoric acid is increased above about 37% objectionable poisonous fumes escape. If, on the other hand, the percentage of hydrofluoric acid is too low the reaction is unnecessarily slow. In all cases hydrofluoric acid has such effect that silica separates in substantially heavy form, a solid granular form. In contrast with this, sulphuric acid alone causes precipitation of silica as colloidal silica. Sulphuric acid when present in too great excess over that required by the aluminum present for the formation of sulphate causes the electrolysis to operate unsatisfactorily.

The chemical reaction to break the silica bond proceeds more satisfactorily at elevated temperatures. A temperature of as high as 90 or even 100 degrees centigrade has definite advantages in this process. The electrolysis, on the other hand, is preferably carried on at a lower temperature, as, for example, at room temperature or at 25 degrees C. Ordinarily a voltage of as low as 5 volts may be used effectively. The invention has been developed more especially to provide a process for obtaining aluminum and for the purposes of illustration of the principles of the invention such process will be more particularly described.

In the operation of the process, when treating silicates the silicate bond appears to be broken by the chemical action of the hydrofluoric acid in reversible reaction such that the fluorine is not used up and does not need to be replaced. The sulphuric acid apparently reacts to form aluminum sulphate, which, in turn, by the electrolytic action, yields sulphuric acid in the anode chamber and aluminum at the cathode. Insoluble aluminum hydroxide is precipitated by hydrolyzation.

In the preferred arrangement the electrolyte in the anode chamber is acid and that in the cathode chamber is practically neutral, while an intermediate portion of the cell provides a pH gradient where iron and certain other impurities are precipitated.

The nature and objects of the invention will be better understood from a description of a particular process and particular apparatus illustrating the principles of the invention, for the purpose of which description reference should be had to the accompanying drawing forming a part hereof and in which Figure 1 is a diagrammatic sectional view of an electrolytic cell embodying certain principles of the invention and arranged for the treatment of aluminum silicates according to a preferred embodiment of the invention.

Figure 2:
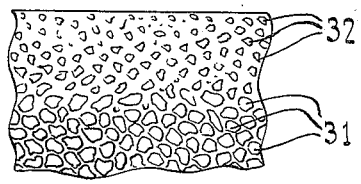

Fig. 2 is a sectional view of silica and clay settled in the reaction chamber.

Referring more particularly to the drawing, the electrolytic cell shown provides a chemical reaction chamber 5, an anode chamber 6, a sludge precipitation chamber 7 and a cathode chamber 8.

In the operation of the process more particularly to be described a charge of, for example, 8 liters of solution containing approximately 200 grams of hydrofluoric acid and 60 cc. of sulphuric acid together with the fine-ground clay such as kaolin or other silicate sufficient to form a slurry of about 7½% concentration is introduced into the chemical reaction chamber 5 while about half the solution filters through a suitable filtering partition 10 into the anode chamber 6. At the same time pure water is introduced into the cathode chamber and the sludge precipitating chamber to maintain suitable liquid levels. The solution noted above may be described as containing about 2.5% hydrofluoric acid and about 0.75% sulphuric acid. Acid of this strength does not seriously attack the glass of the cell but it reacts effectively with the fine-ground silicate.

The partition or barrier 10 is a filter which permits effective diffusion of the solution between the reaction chamber 5 and the anode chamber 6 to permit passage of the dissolved aluminum sulphate into the anode chamber where it is acted upon electrolytically.

In the chemical reaction chamber 5 the slurry is preferably heated by heating unit 11 to a temperature of 80 to 90 degrees C. and agitated by a stirring device 12. A high temperature, even up to boiling, improves the chemical action. In operation the silicate is broken down and aluminum sulphate is formed in the reaction chamber. By diffusion the soluble aluminum sulphate passes through the filter 10 to maintain a sufficient concentration of aluminum sulphate for electrolysis in the anode chamber 6.

The filter 10 may be formed in two sections provided by three porous partitions 15, which may be made of a suitable acid-proof plastic material with granular material, for example sulphur, or other material which is inert in the process, between the partitions packed sufficiently to constitute an effective filter but not too tight to permit the desired diffusion. By this arrangement the granular material in one compartment or the other may be removed and replaced with fresh material as contamination may require.

The anode 18 in the anode chamber is preferably of carbon. The cathode 19 in the cathode chamber may be of carbon, aluminum, lead or other suitable material. More effective electrolytic operation is obtained if the temperature of the electrolyte is at a lower temperature than that preferred in the chemical reaction chamber. Accordingly, a heat exchange coil 20 through which a cooling fluid may be circulated is provided in the anode chamber.

Preferably the electrolyte in the anode chamber is maintained at room temperature or at a temperature of about 25 degrees C. The electrolyte in the cathode chamber should be maintained substantially neutral. Pure water provides a satisfactory electrolyte. A certain amount of acid according to qualities of the diaphragm may diffuse into the cathode chamber. It may be neutralized by the addition of alkali or by alkali contained in the mineral matter treated. In order to maintain the neutrality of the electrolyte in the cathode chamber a conduit 21 with an outlet below or adjacent the cathode is provided for the purpose of introducing carbon dioxide or sulphur dioxide or a sodium compound or suitable neutralizing elements to counteract any alkalinity or acidity which may develop.

A pH gradient between the anode and cathode chambers is provided in the arrangement shown by the intermediate sludge chamber 7 with porous diaphragms or partitions 23 and 24 between the sludge chamber and the anode and cathode chambers.

The partition 23 is formed in two sections, either of which alone provides a sufficient diaphragm between the two chambers. By this arrangement the sections can be cleaned alternately as operation of the process may require. Each section is formed of some adsorbent, such as activated carbon, suitably packed between the partition walls 25, of suitable perforated plastic. The activated carbon may be prepared in any suitable way and for convenience of removal may be packed in suitable fabric bags 26 fitting between the partition walls. A preferred form of activated carbon is prepared in accordance with known procedures. For example we may select lignites soluble in alkalis, mix these with alkali and carbonize in a stream of inert gas to exclude air, then wash with water to remove alkali and silica. Now activate, for example, with superheated steam. This activated carbon will absorb silica. Instead of activated carbon an active magnesium compound such as basic magnesium carbonate may be used as adsorbent. The partitions of activated carbon and basic magnesium carbonate or other appropriate adsorbent compound are particularly effective in collecting the last traces of silica by adsorption and are selected for this reason.

The filter partition 24 comprises the three perforated plastic partitions 28 with two separate filter cartridges 29 separately removable for cleaning or replacement. Each of these filter cartridges may be formed of several sheets of filter cloth or the like.

A suitable pH must be maintained in chambers 7 or 8. To avoid excessive alkalinity a current of $CO_2$ or $SO_2$ is useful. If free alkali is allowed to accumulate in the cathode chamber the process is reversed and alumina goes to the anode and silica to the cathode. A conduit 30 is provided for introduction of the neutralizing agent.

The suitable pH gradient will cause iron, titanium and other hydrolyzable impurities to be deposited principally in the sludge chamber 7, from which they can be removed from time to time, and in part in the removable sections of the partitions 23 and 24. As the aluminum ions pass to the cathode in the operation of the cell the electrical charge is discharged and by hydrolyzation insoluble aluminum hydroxide is formed. By this process aluminum hydroxide in pure condition is obtained.

The solution used may vary in composition but is preferably so composed that substantially the entire content of sulphuric acid will be converted to $Al_2(SO_4)_3$ and maintained in this state during operation of the process. The rate of supply of clay or other silicates is suitably regulated. By proper arrangement and regulation substantially the whole electric current may be spent on electrolysis of aluminum sulphate and on nothing else and the separation of aluminum thus is made with substantially theoretical expenditure of current. Hydrofluoric acid is a weak electrolyte and contributes little to the total conductivity. The pure water in the cathode chamber permits travel of ions of aluminum under the potential gradient applied.

The silica deposited in the reaction chamber is substantially in granular form and is easily separated from time to time. When the mass is allowed to settle the coarse silica 31 goes to the bottom and the clay 32 forms an upper stratum. A cross-section of the material after settling is indicated in Fig. 2. The silica can be separated mechanically and the clay suspended again for reaction.

The reactions are believed to be represented by the following:

The composition of the silicate is given by the formula $$(Al_2O_3)_m(SiO_2)_n H_2O$$

wherein $m$ and $n$ may be different in various specimens of silicates. The silicate is decomposed by the fluoride as indicated in the equations:

$$SiO_2 + 4HF \rightarrow SiF_4 + 2H_2O$$
$$SiF_4 + 4H_2O \rightarrow Si(OH)_4 + 4HF$$
$$Al_2O_3 + 6HF \rightarrow Al_2F_6 + 3H_2O$$
$$Al_2F_6 + 3H_2SO_4 \rightarrow Al_2(SO_4)_3 + 6HF$$

$Al_2(SO_4)_3$ is the only conductive substance present which is decomposed by the current in such a way that $SO_4$ goes to the anode, where it decomposes into $SO_3$ and oxygen, and thus $H_2SO_4$ is being regenerated.

$$SO_3 + H_2O \rightarrow H_2SO_4$$

At the same time ions of aluminum discharge at the cathode and at this moment they react with water, forming the hydroxide and evolving hydrogen.

$$Al_2 + 6H_2O \rightarrow Al_2(OH)_6 + 3H_2$$

The principles of the invention are applicable not only to the production of aluminum but also for the decomposition of silicates for other purposes. The process described can be readily applied with or without modification for obtaining silica or metals other than those mentioned, as for example iron or the like.

This application is a continuation in part of applicant's co-pending applications Serial Number 487,245, filed May 7, 1943, and Serial Number 489,746, filed June 5, 1943, both now abandoned.

The foregoing description of a particular embodiment of the invention is illustrative merely and is not intended as defining the limits of the invention. Numerous modifications and substitutions can be made without departing from the spirit of the invention as defined in the appended claims.

I claim:

1. The process for treating aluminum silicate containing iron as an impurity to produce aluminum hydroxide which comprises reacting aluminum silicate with a mixture consisting of about 2.5% hydrofluoric acid and about 0.75% sulphuric acid to produce aluminum sulphate, and electrolyzing the aluminum sulphate in an electrolytic cell having anode, cathode and intermediate compartments while maintaining a sulphuric acid and hydrofluoric acid electrolyte in the anode compartment, with a substantially neutral electrolyte in the cathode compartment to precipitate aluminum hydroxide at the cathode while maintaining an intermediate pH in the intermediate chamber and causing precipitation of iron therein.

2. The method of treating aluminum silicate to produce aluminum hydroxide which comprises reacting the aluminum silicate with a mixture of about 0.75% sulphuric acid and about 2.5% hydrofluoric acid to produce aluminum sulphate, subjecting the aluminum sulphate together with sulphuric and hydrofluoric acids to electrolysis in the anode chamber of an electrolytic cell, while maintaining water in the cathode chamber of the cell in substantially neutral condition and thereby forming aluminum hydroxide in the cathode chamber substantially as and for the purpose described.

GEORGE ANTONOFF.

REFERENCES CITED

The following references are of record in the file of this patent:

UNITED STATES PATENTS

| Number | Name | Date |
|---|---|---|
| 683,000 | Roberts | Sept. 17, 1901 |
| 1,290,269 | McKee | Jan. 7, 1919 |
| 1,359,002 | Thomas | Nov. 16, 1920 |
| 1,382,808 | Sem | June 28, 1921 |
| 1,559,179 | Pomilio et al. | Oct. 27, 1925 |
| 1,661,618 | Muth | Mar. 6, 1928 |

FOREIGN PATENTS

| Number | Country | Date |
|---|---|---|
| 6,449 | Great Britain | 1908 |
| 6,727 | Great Britain | 1915 |
| 496,117 | France | July 23, 1919 |

OTHER REFERENCES

J. W. Mellor, "A Comprehensive Treatise or Inorganic and Theoretical Chemistry," vol. V, Longman's Green & Co., New York, 1924, pages 286 and 287.